(12) United States Patent
Xu

(10) Patent No.: US 8,358,645 B2
(45) Date of Patent: Jan. 22, 2013

(54) DETERMINING A PHYSICAL LOCATION OF A VOIP ENDPOINT DEVICE UTILIZED TO ORIGINATE AN EMERGENCY CALL

(75) Inventor: Xiaode Xu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 854 days.

(21) Appl. No.: 11/404,652

(22) Filed: Apr. 14, 2006

(65) Prior Publication Data

US 2007/0242660 A1 Oct. 18, 2007

(51) Int. Cl.
*H04L 12/66* (2006.01)
(52) U.S. Cl. ...................................................... 370/352
(58) Field of Classification Search .......... 370/351–356, 370/389; 379/45, 37; 707/102; 455/404.2
See application file for complete search history.

(56) References Cited

U.S. PATENT DOCUMENTS

| | | | | |
|---|---|---|---|---|
| 7,042,985 | B1 * | 5/2006 | Wright | 379/45 |
| 7,177,399 | B2 * | 2/2007 | Dawson et al. | 379/45 |
| 7,742,578 | B1 * | 6/2010 | Klesper et al. | 379/45 |
| 2003/0216143 | A1 * | 11/2003 | Roese et al. | 455/456.1 |
| 2005/0169248 | A1 * | 8/2005 | Truesdale et al. | 370/352 |
| 2005/0232164 | A1 * | 10/2005 | Anzarouth et al. | 370/255 |
| 2006/0120517 | A1 * | 6/2006 | Moon et al. | 379/45 |
| 2006/0251066 | A1 * | 11/2006 | Uusikartano et al. | 370/389 |
| 2006/0252408 | A1 * | 11/2006 | Faccin et al. | 455/404.2 |
| 2007/0121798 | A1 * | 5/2007 | Croy et al. | 379/37 |
| 2007/0147348 | A1 * | 6/2007 | Lu | 370/352 |
| 2007/0220038 | A1 * | 9/2007 | Crago | 707/102 |
| 2010/0312869 | A1 * | 12/2010 | Mitchell | 709/223 |

FOREIGN PATENT DOCUMENTS

EP 1435707 A1 * 7/2004

OTHER PUBLICATIONS

Polk, J. et al., RFC 3825—Dynamic Host Configuration Protocol Option for Coordinate-based Location Configuration, Internet RFC/STD/FYI/BCP Archives, Jul. 2004, www.faqs.org/rfcs/rfc3825.html, The Internet Society, USA.
United States Patent and Trademark Office, International Search Report, Jun. 19, 2008, 3 pgs.
International Telecommunication Union, "H.323 System Implementors' Guide", Aug. 5, 2005.
National Emergency No. Association (NENA) VoIP-Packet Technical Committee, "Interim VoIP Architecture for Enhanced 9-1-1 Services (i2)", Dec. 6, 2005.
GPS Navstar, "Global Positioning System Standard Positioning Service Signal Specification, 2nd Edition", Jun. 2, 1995.

(Continued)

*Primary Examiner* — Yuwen Pan
*Assistant Examiner* — Sonia Gay
(74) *Attorney, Agent, or Firm* — Lempia Summerfield Katz LLC

(57) ABSTRACT

In one embodiment, a method and system for enabling determination of a physical location of a Voice Over Internet Protocol (VoIP) endpoint device utilized to originate an emergency call are described. A network location associated with the VoIP endpoint device is automatically detected. The VoIP endpoint device is coupled with a VoIP network via a port of a network device (e.g., a wireline or a wireless network device). The network location includes an identity of the network device and an identity of the port. The network location is saved and upon initiation of an emergency call, the VoIP endpoint device forwards the network location to a device capable of converting the network location to a physical location.

19 Claims, 4 Drawing Sheets

OTHER PUBLICATIONS

Cisco Systems, Inc. "Ciscoworks Wireless LAN Solution Engine", Jun. 2005.

Polk et al., "Session Initiation Protocol Location Conveyance", Jul. 17, 2005.

Schulzrinne et al., "Requirements for Emergency Context Resolution with Internet Technologies (RFC 5012)", Jan. 2008.

Polk et al., "Dynamic Host Configuration Protocol Option for Coordinate-based Location Configuration Information (RFC 3825)", Jul. 2004.

Rosenberg et al., "SIP: Session Initiation Protocol (RFC 3261)", Jun. 2002.

Peterson, "A Presence-based GEOPRIV Location Object Format (RFC 4119)", Dec. 2005.

Symmetry Electronics Corporation, "Whitepaper: Assisted GPS", Oct. 2, 2004.

* cited by examiner

US 8,358,645 B2

DETERMINING A PHYSICAL LOCATION OF A VOIP ENDPOINT DEVICE UTILIZED TO ORIGINATE AN EMERGENCY CALL

TECHNICAL FIELD

Embodiments in accordance with the present invention generally pertain to determining a physical location of a Voice Over Internet Protocol (VoIP) endpoint device utilized to originate an emergency call.

BACKGROUND

Many countries, including the United States, have an emergency telephone number (e.g., 9-1-1 in the United States) that a caller can dial to contact local emergency services for assistance. In general, for the local emergency service to be able to respond quickly, a caller's location needs to be determined efficiently.

DETAILED DESCRIPTION OF THE DRAWINGS

Figure 1:
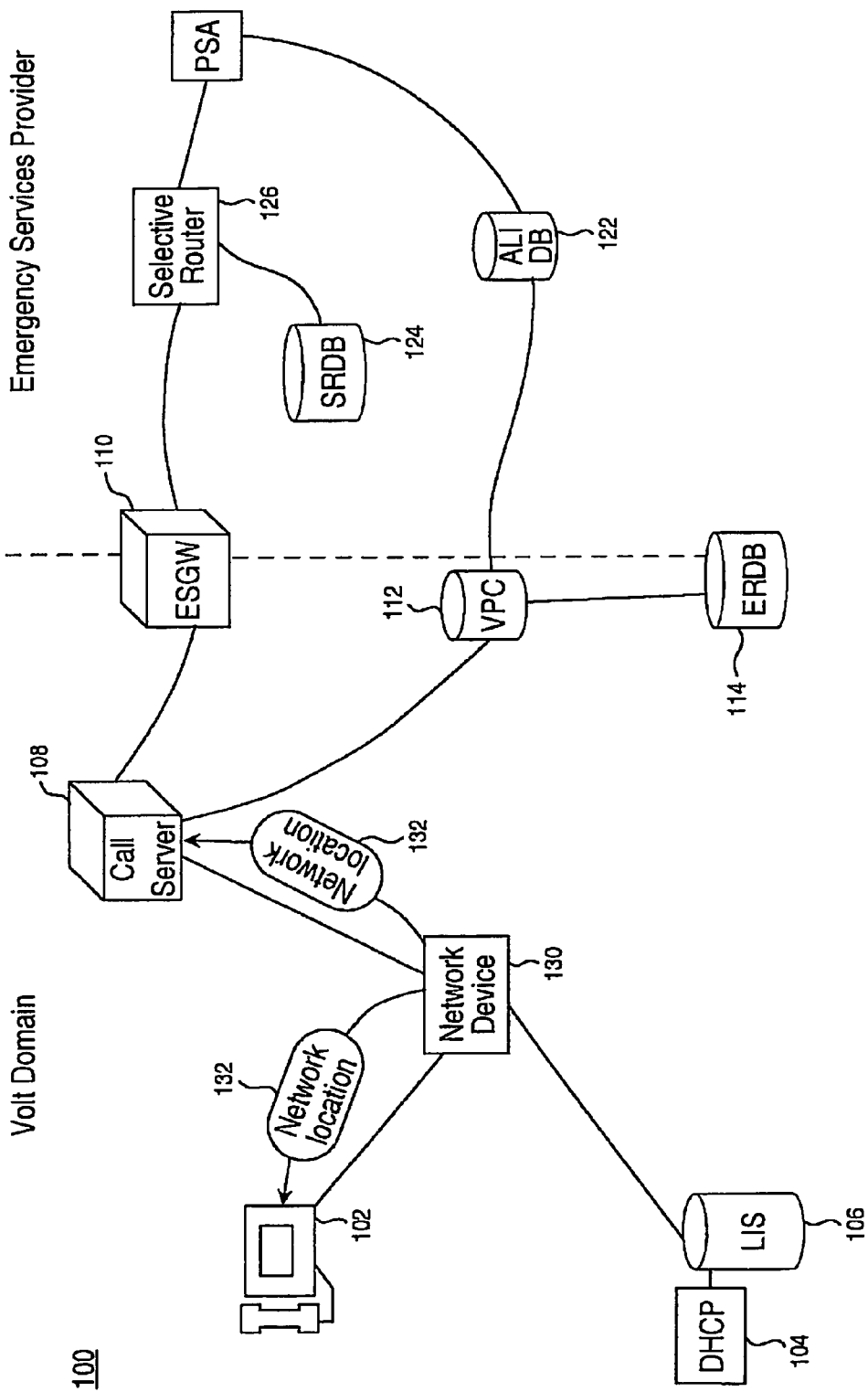
FIG. 1 illustrates block diagrams of an emergency call routing system, upon which embodiments can be implemented.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which can be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention can be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

In order for an emergency response service to function well, an efficient way to locate an emergency caller is usually needed. Yet, the conventional method of determining an emergency caller's location was designed with legacy public switched telephone networks (PSTN) in mind and newer forms of voice communications, such as wireless and Voice Over Internet Protocol (VoIP) telephony is not as compatible with conventional location tracking methods.

With conventional legacy PSTN, an emergency caller's telephone number can be mapped to a specific civic or geographical location. This works because with legacy PSTN, a telephone number is associated with a phone jack fixed in its location. Consequently, an emergency call can be tracked by using the emergency's caller's telephone number to find its corresponding location.

In contrast to legacy PSTN systems, an IP phone's telephone number is often associated with the IP phone module itself. Hence, the IP phone can be unplugged and moved from one Ethernet port in one physical location to another Ethernet port in another physical location while maintaining the same phone number. As a result, an IP phone's telephone number may not be able to be mapped into a particular physical location. Hence, an emergency response service may have trouble tracking the location of an emergency call that originated from an IP phone.

To address these concerns, embodiments set forth methods and systems for enabling determination of a physical location of a Voice Over Internet Protocol (VoIP) endpoint device utilized to originate an emergency call.

In one example, a network location associated with the VoIP endpoint device, (e.g., a IP phone) is automatically detected. The VoIP endpoint device is coupled with a VoIP network via a port of a network device. The network location comprises an identity of the network device and port information, such as the port number utilized to connect the VoIP endpoint device to the VoIP network. The network location is saved and upon initiation of an emergency call, the VoIP endpoint device forwards the network location to a device capable of converting the network location to a physical location.

FIG. 1 illustrates block diagrams of an emergency call routing system 100, upon which embodiments can be implemented. System 100 includes an IP endpoint device 102, a network device 130 for connecting IP endpoint device 102 to the VoIP network, call server 108, Emergency Services Gateway (ESGW) 110, VoIP Positioning Center (VPC) 112, Emergency Services Zone Routing Database(ERDB) 114, Automatic Location Identification (ALI) Database 122, Selective Routing Database (SRDB) 124, E-911 selective router 126, (PSAP) 128, Dynamic Host Configuration Protocol (DHCP) server 104, and Location Information Server (LIS) 106.

Although emergency call routing system 100 is shown and described as having certain numbers and types of elements, the embodiments are not necessarily limited to the exemplary implementation. That is, emergency call routing system 100 can include elements other than those shown, and can include more than one of the elements that are shown. For example, emergency call routing system 100 can include a greater or fewer number of ESGWs than the one ESGW (ESGW 110) shown. Similarly, in another example, emergency call routing system 100 can include a network location database (not shown).

IP endpoint device 102 is connected to the network via a port of network device 130. IP endpoint device 102 (e.g., an IP phone), in one embodiment, automatically detects and saves its associated network location 132. Network location 132 includes network device identity information and port information (e.g., port number used by the IP endpoint device 102) on network device 130. The IP endpoint device 102 includes emergency parameter information, such as Presence Information Data Format—Location Objects (PIDF-LO) and/or Location Key (LK), and in the present embodiment, the emergency parameter information includes network location 132. In one example, when the IP endpoint device 102 makes an emergency call, the emergency parameter, including network location 132 is sent within the emergency (e.g., E-9-1-1) call initiation request. In one embodiment, the emergency call initiation request is sent with Session Initiation Protocol (SIP). In other embodiments, the emergency call initiation request can be sent using other compatible protocols.

In one embodiment, using SIP, IP endpoint device 102 sends call initiation request to call server 108. A call server 108 can be an entity in a private or public IP domain that provides service to the IP endpoint device 102. The call server 108 can, in one embodiment, interwork with other elements in the IP domain used to support emergency services call routing. The call server 108 can use Session Initiation Protocol (SIP) and/or another VoIP signaling protocol within its serving domain. The call server 108 receives the call initiation request and sends a routing request to the VoIP Positioning Center (VPC) 112 using the information received in the call request. The routing request may be sent directly or after certain pre-processing. For example, the network location may be converted to its corresponding civic location before inquiring a VPC if the VPC does not support the network location.

The Location Information Server (LIS) 106 can be used as a repository for location information, such as civic address and/or geo-spatial location attributes correlated with a particular physical location. In one embodiment, the LIS 106 is configured with mappings between individual location information and a logical representation of the physical locations with which they are associated. In one example, the LIS 106, in one embodiment, is capable of mapping network location 132 of IP endpoint device 102 into a civic address and/or geo-coordinates. In one embodiment, Dynamic Host Configuration Protocol (DHCP) server 104 is coupled with LIS 106 and can provide configuration information to IP devices and/or IP endpoints. In one example, the DHCP server 104 is utilized to allocate dynamically assigned IP addresses to an IP device (e.g., IP endpoint device 102).

In one embodiment, once LIS 106 is identified, VPC 112 queries LIS 106 and receives a physical location (e.g., geo-coordinates and/or civic location) associated with the network location 132. Also, in one embodiment, the VPC can map network location 132 to an E.164 telephony number. Furthermore, in one embodiment, VoIP Positioning Center (VPC) 112 provides routing information to support the routing of VoIP emergency calls and cooperates in delivering location information to the Public Safety Answering Point (PSAP) 128 over an ALI DB 122.

In one embodiment, the VPC 112 uses the physical location to obtain emergency services zone related routing information from the ERDB 114. Emergency Services Zone Routing Database (ERDB) 114 includes routing information associated with each Emergency Services Zone in a serving area. The ERDB 114 identifies the emergency services routing number, emergency service, and CRN that facilitates routing via the appropriate ESGW 110 to the selective router (SR) 126. VPC 112 uses the received routing information to allocate an available emergency services query key associated with the caller's location and sends a response to the routing request for the emergency call. The VPC 112 also maps the IP endpoint device's callback tel.uri and physical location into appropriate fields.

Call server 108 uses the emergency services routing number received from VPC 112 to select ESGW 110. Emergency Services Gateway (ESGW) 110, in one embodiment, serves as the signaling and media interworking point between the IP domain and conventional trunks to the emergency service (e.g., E9-1-1) router that use, in one embodiment, multi-frequency signaling. The ESGW utilizes the routing information provided in the received call setup signaling to select the appropriate trunk and proceeds to signal call setup to the selective router 126 using Emergency Services Query Key (ESQK) to represent the calling party number and/or automatic number identification information. In the present embodiment, ESGW 110 is selected and used to route the emergency call. In one embodiment, ESGW 110 uses the received emergency services routing number to select an outgoing route (e.g., a trunk group) to the selective router 126. Selective router 126 receives the emergency call and identifies Public Safety Answering Point (PSAP) 128 for the emergency call. The PSAP 128 sends an automatic location identification query to the ALI DB 122, which in turn queries VPC 112 for physical location information and callback number.

Figure 2B:
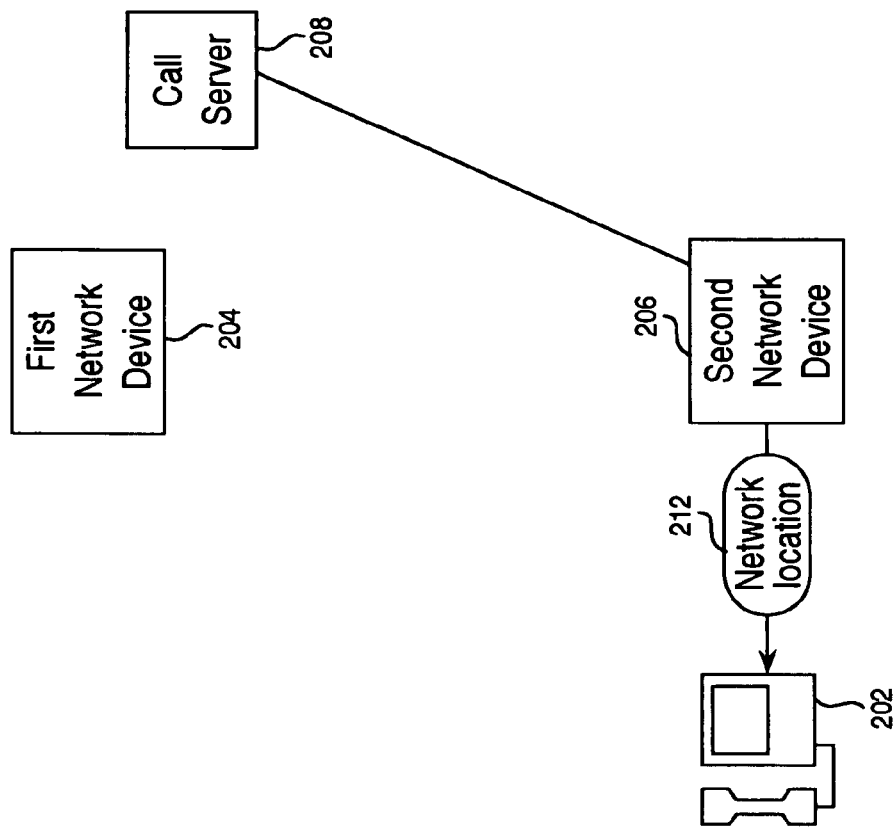
FIG. 2A and 2B illustrate block diagrams of an Internet Protocol (IP) phone configured to automatically detect, save, and update its network location in operation, upon which embodiments can be implemented.
Figure 2A:
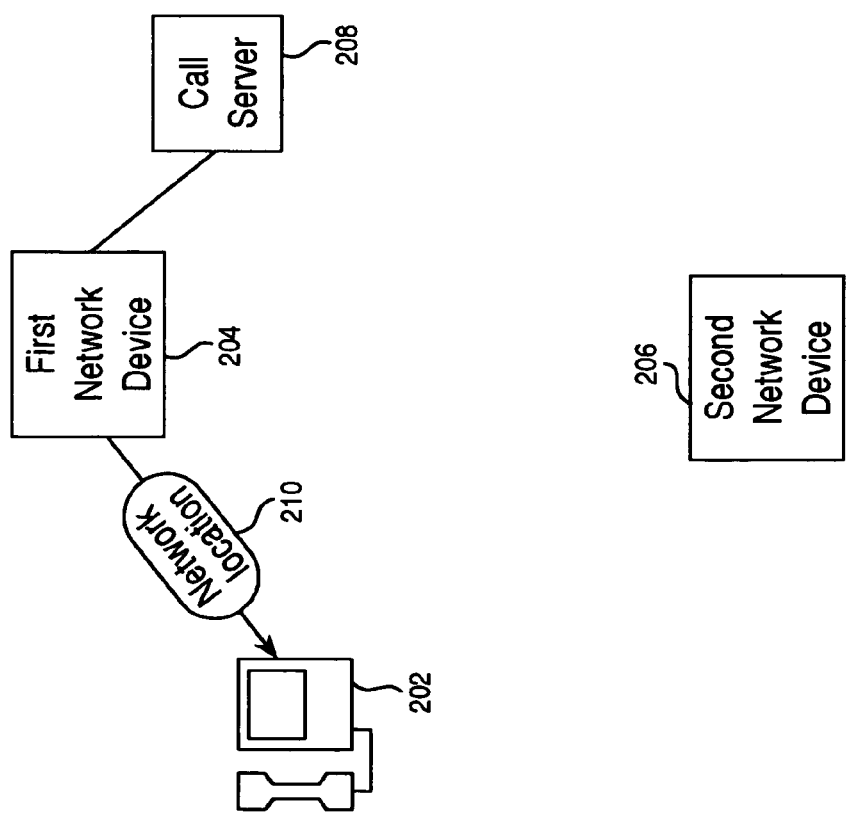

FIGS. 2A and 2B illustrate block diagrams of an Internet Protocol (IP) phone configured to automatically detect, save, and update its network location in operation, upon which embodiments can be implemented. FIG. 2A includes an IP phone 202, first network device 204, call server 208, and second network device 206.

While FIGS. 2A and 2B are shown and described as having certain numbers and types of elements, the embodiments are not necessarily limited to the exemplary implementation. That is, FIGS. 2A and 2B can include elements other than those shown, and can include more than one of the elements that are shown. For example, FIGS. 2A and 2B can include a greater or fewer number of network devices than the two network devices (first network device 204 and second network device 206) shown.

In FIG. 2A, IP phone 202 is coupled with call server 208 via a port of first network device 204. IP phone 202, in one example, automatically detects its associated network location 210, which includes network identity information of first network device 204 and the port number on first network device 204 that IP phone 202 uses. IP phone 202 saves the network location 210, and in the event of an emergency call, forwards the network location 210 with a call initiation request.

Also, although the present embodiment is described in the context of a non-wireless IP phone, a wireless IP phone can be used in other embodiments. In one embodiment, a wireless IP phone automatically detects the network device identity of the network device as well as the radio port on the network device that it communicates with. In one example, as a wireless IP phone roams from one network device to another network device (e.g., from network device 204 to network device 206) it automatically detects, saves and updates its current network location.

In FIG. 2B, in the present embodiment, IP phone 202 is de-coupled with first network device 204 and coupled with second network device 206. In FIG. 2B, IP phone 202 is coupled with call server 208 via a port of the second network device 206. In one embodiment, an updated version of network location, network location 212, is detected and saved by IP phone 202 to reflect the possible physical location change that may have occurred. With reference still to FIG. 2B, in one example, IP phone 202 initiates an emergency call and the updated version of network location, network location 212, is forwarded to call server 208. In contrast to passive approaches, the present embodiment automatically detects, saves, and forwards its updated network location to a call server as it is moved from one location to another location, which is important for wireless IP phone users.

Figure 3:
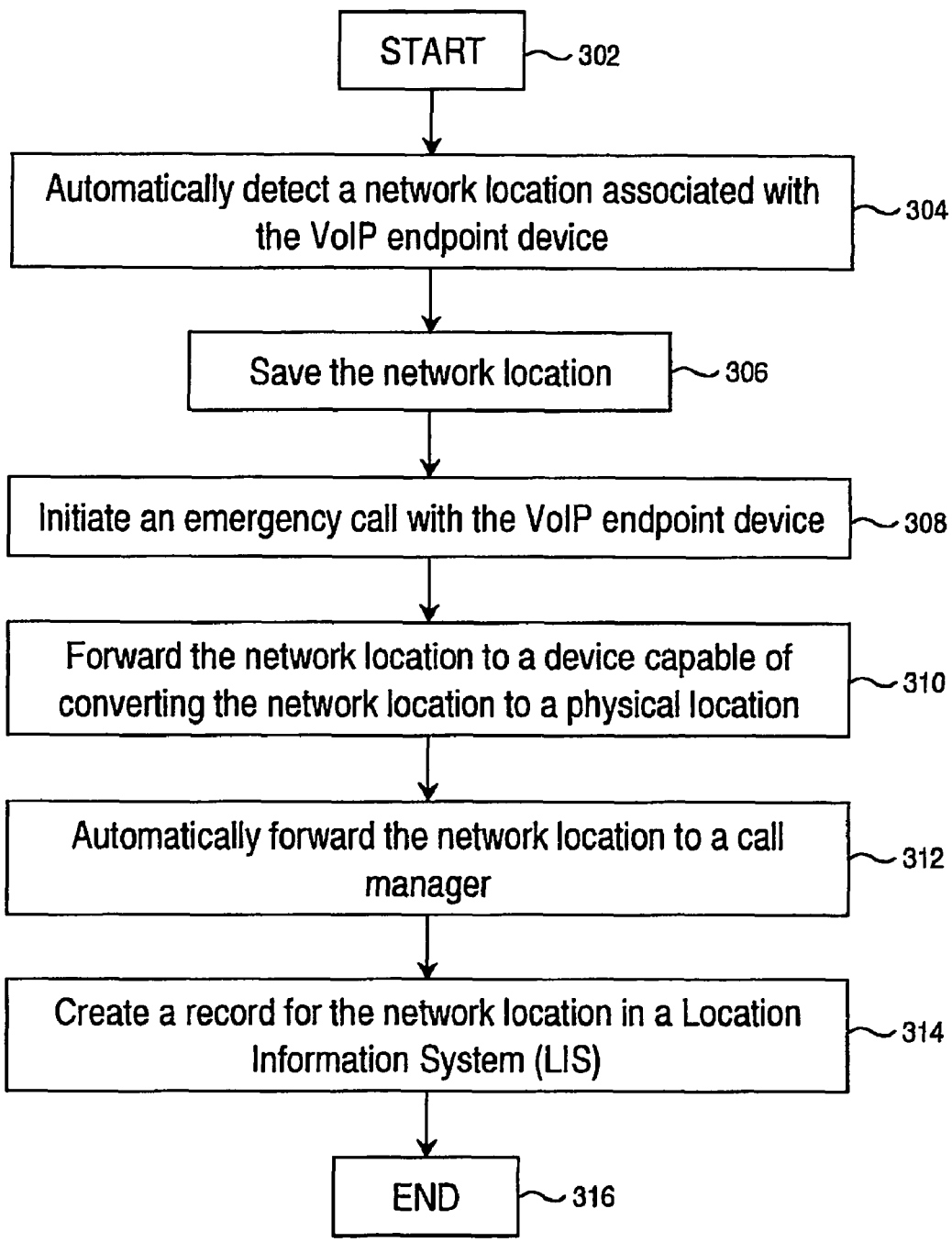
FIG. 3 illustrates a flowchart of a method of enabling determination of a physical location of a Voice Over Internet Protocol (VoIP) endpoint device utilized to originate an emergency call, upon which embodiments can be implemented.

FIG. 3 illustrates a flowchart 300 of a method of enabling determination of a physical location of a Voice Over Internet Protocol (VoIP) endpoint device utilized to originate an emergency call, upon which embodiments can be implemented. Although specific steps are disclosed in flowchart 300, such steps are exemplary. That is, embodiments are well suited to performing various other or additional steps or variations of the steps recited in flowchart 300. It is appreciated that the steps in flowchart 300 can be performed in an order different than presented.

At block 302, the process starts.

At block 304, a network location associated with the VoIP endpoint device is automatically detected. The VoIP endpoint device is coupled with a VoIP network via a port of a network device. Also, the network location comprises an identity of the network device and port information. In one embodiment, port information can include port number of the port on the network device utilized to connect the VoIP endpoint device to the VoIP network. In one embodiment, automatic detection is implemented by utilizing a Cisco Detection Protocol (CDP). In another embodiment, automatic detection is implemented by utilizing a Simple Network Management Protocol (SNMP). In other embodiments, automatic detection is implemented by utilizing other types of protocol compatible with VoIP endpoint device.

At block 306, the network location is saved. In one embodiment, the network location is saved onto a non-volatile memory, such as certain writable Read-Only Memory (ROM), flash memory, hard disks, floppy disks, magnetic tapes, optical disk drives, and Magnetic Random Access Memory (MRAM). In another embodiment, the network location is saved onto a volatile memory, such as Random Access Memory (RAM), Dynamic Random Access Memory (DRAM), Static Random Access Memory (SRAM), Content Addressable Memory, dual-ported RAM, and/or other types volatile memory.

At block 308, an emergency call is initiated with the VoIP endpoint device. The VoIP endpoint device can be a wireless IP phone, a regular IP phone, and/or other types of compatible devices. In addition, the network location can be a media access control (NIAC) address, other layer 2 addresses (e.g., an E.164 number), and/or other types of designation information.

At block 310, the network location is forwarded to a device capable of converting the network location to a physical location. In one embodiment, the network location is forwarded using Session Initiation Protocol (SIP). Also, in one example, the network location is included in the SIP Initiation message (e.g., SIP INVITE). Also, physical location can be a set of geo-coordinates and/or a civic location. In one embodiment, the device is capable of converting the network location into a Master Street Address Guide (NSAG) validated civic location.

At block 312, the network location is automatically forwarded to a call server. A call server can be an entity in a private or public IP domain that provides service to the VoIP endpoint device. The call server can, in one embodiment, interwork with other elements in the IP domain used to support emergency services call routing. The call server can use Session Initiation Protocol (SIP) and/or another VoIP signaling protocol within its serving domain.

At block 314, a record for the network location is created in a Location Information System (LIS). The Location Information Server (LIS) can be used as a repository for location information, such as civic address and/or geo-spatial location attributes correlated with a particular physical location. In one embodiment, the LIS is configured with mappings between individual location information and a logical representation of the physical locations with which they are associated. In one example, the LIS, in one embodiment, is capable of mapping network location of VoIP endpoint device into a civic address and/or geo-coordinates.

At block 316, the process ends.

Figure 4:
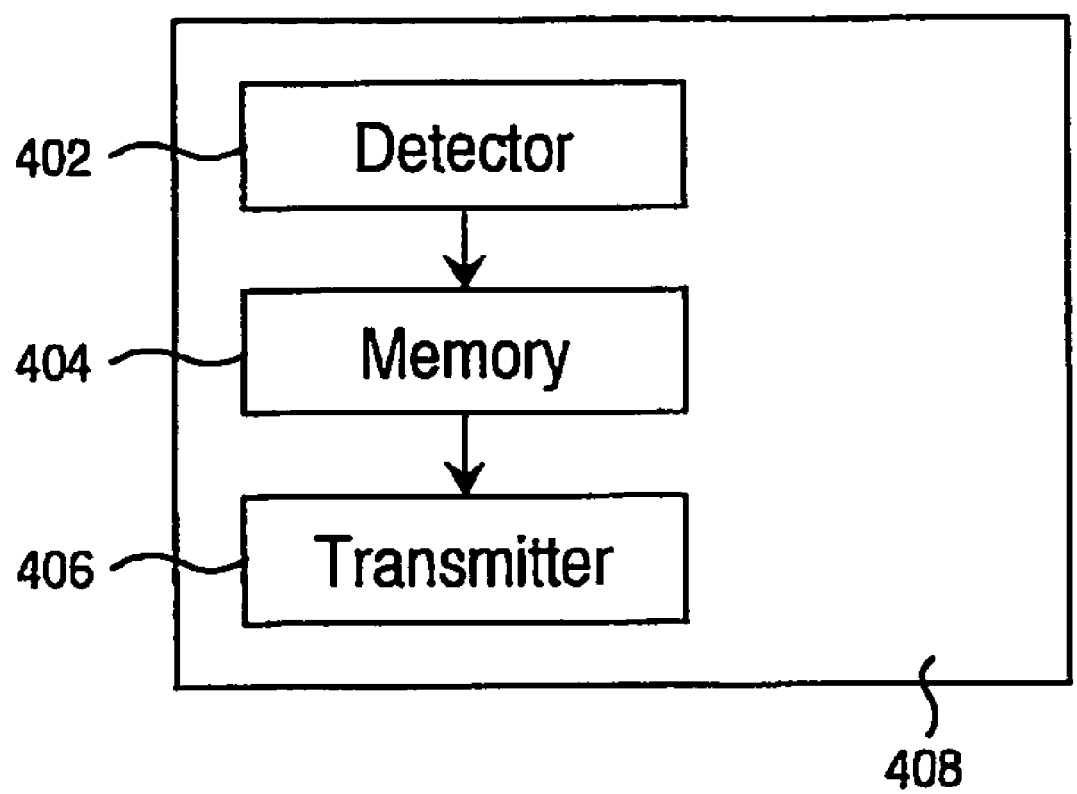
FIG. 4 illustrate block diagrams of a system for enabling determination of an actual location of a communications device on an emergency call in a network, upon which embodiments can be implemented.

FIG. 4 illustrate block diagrams of a system 400 for enabling determination of an actual location of a communications device on an emergency call in a network, upon which embodiments can be implemented. System 400 includes a communications device 408, a detector 402 for determining a network location of the communications device, a memory 404 for storing the network location, and a transmitter 406 for forwarding the network location to a device capable of mapping the network location to the actual location. Detector 404 and transmitter 406 are coupled with memory 404.

Though System 400 are shown and described as having certain numbers and types of elements, the embodiments are not necessarily limited to the exemplary implementation. That is, System 400 can include elements other than those shown, and can include more than one of the elements that are shown. For example, System 400 can include a greater or fewer number of network devices than the one transmitter (transmitter 406) shown.

The elements of system 400 efficiently cooperate to enable determination of an actual location (e.g., civic location and/or geo-coordinates) of a communications device on an emergency call in a network. In one embodiment, the communications device is an Internet Protocol (IP) phone.

Detector 402 of the communications device 408 determines a network location of the communications device 408. The communications device 408 is coupled with the network via a network device having a plurality of ports. Also, a network device identity is associated with the network device. In one example, network location of the communications device 408 includes the network device identity and port information (e.g., port number of the port used by communications device 408 to couple with the network).

Memory 404 stores the network location and transmitter 406 forwards the network location to a device capable of mapping the network location to the actual location. The device, in one embodiment, is further capable of utilizing emergency service query key (ESQK) to retrieve a civic location associated with the network location. Also, the device can be coupled with an automatic number identification (AND) database and/or an automatic location information (ALI) database.

In one embodiment, the transmitter 406 forwards the network location upon initiation of an emergency call by the communications device 408. In another embodiment, the transmitter 406 forwards the network location upon receiving network device identity and port information from the network device. In one embodiment, the network device can be a repeater access point.

To summarize, embodiments allow the physical location of a VoIP endpoint device (e.g., wireless IP phone) used to make an emergency call to be determined efficiently. The network location associated with the VoIP endpoint device is automatically detected, saved, and forwarded to a device capable of converting the network location to a physical location (e.g., a civic location).

Different from the discovery-based location approach, embodiments do not require maintenance of large subsystems that generate a significant amount of network traffic. Also, the discovery-based location approach is passive and may not work well for certain VoIP endpoint devices, such as wireless IP phones. For instance, a discovery sweep may be performed in intervals, such as once every two hours, to discover the location of IP phones. However, in one example, if a wireless IP phone is moved from one location to a different location soon after the completion of one discovery sweep, the call server would not be aware of this change until a subsequent discovery sweep is performed. In contrast to this passive approach, in one embodiment, a wireless IP phone automatically detects, saves, and forwards its associated network address to a call server as it is moved from one location to another location.

Moreover, in one embodiment, the inter-cluster cross-reference of the emergency routing data (e.g., 911 routing data) for a proper Public Safety Answering Point (PSAP) is not needed, which may help to simplify the design of an emergency response subsystem, such as the E911 application subsystem.

Additionally, in comparison to a Structured Wireless Aware Network (e.g, a Cisco Structured Wireless Aware Network based on 802.11 association) client tracking system, embodiments can provide more accurate tracking when an IP phone is connected via a hub or a repeater access point. With SWAN client tracking, in one example, if a caller is connected via a repeater access point that forwards the call to a registered access point, SWAN is limited to using the registered access point instead of the repeater access point, which is closer to the caller, to determine the caller's location. Advantageously, in one embodiment, the network location of an IP phone can be utilized to track down the repeater access point to more accurately determine a caller's location.

Furthermore, network location is a more natural representation of an IP endpoint device's location because network location is easier to adopt and to implement in a VoIP network.

In the foregoing specification, embodiments of the invention have been described with reference to numerous specific details that can vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. Circuitry for sending an emergency services call in a Voice over Internet Protocol (VoIP) network, the circuitry configured to perform the following method comprising:
   automatically detecting and saving in memory in an endpoint communications device network location information in response to moving an endpoint communications device from a first location to a second location, wherein the network location information comprises specific network device identity information and port identification of a network device, wherein the network device is in communication with the endpoint communications device via a port identified by the port identification,
   wherein a physical location of the endpoint communications device is to be mapped to both the network device identity and the port identification and is to be determined based at least in part on the network location information, the physical location comprising a specific civic location or geo-coordinates, or combinations thereof;
   generating an emergency services call initiation request wherein the call initiation request comprises an emergency parameter and the network location information, wherein the emergency parameter comprises a location object in presence information data format;
   automatically forwarding the network location information to a call server for physical location mapping to the network location, wherein routing the call is to be based at least in part on the network location information or the physical location, or combinations thereof.

2. The method of claim 1, wherein the network device is in the network.

3. The method of claim 1, wherein the endpoint communications device is a mobile telephone.

4. Circuitry for routing an emergency services call in a Voice over Internet Protocol (VoIP) network, the circuitry configured to perform the following method comprising:
   receiving an emergency services call initiation request comprising network location information and an emergency parameter wherein the emergency parameter comprises a location object or location key;
   analyzing the network location information received in the call initiation request wherein the network location information comprises specific network device identity information and port information of the network device wherein the port information is for connecting an endpoint to the network and wherein the network device is a repeater communicatively coupled to a registered access point;
   accessing a VoIP Positioning Center (VPC) to retrieve physical location information to identify a specific physical location of the endpoint, the specific physical location corresponding to the network location information received in the call wherein the physical location comprises a specific civic location or geo-coordinates, or combinations thereof, corresponding to the repeater;
   wherein accessing the VPC includes accessing an Location Information Server (LIS) configured to map the network location information to the specific civic location or geo-coordinates of the endpoint, or combinations thereof;

accessing a database to obtain routing information corresponding to selecting an Emergency Services Gateway (ESGW) based at least in part on the physical location information; and routing an emergency services request call based at least in part on the physical location information or on the network location information, or combinations thereof.

5. The method of claim 4, wherein routing further comprising accessing a server where the server provides routing information to route the emergency services call to a Public Safety Answering Point (PSAP) based at least in part on the physical location information.

6. The method of claim 5 further comprising providing the physical location information to the PSAP with the call.

7. The method of claim 5, further comprising mapping the physical location information to an E.164 telephone number and forwarding the E.164 telephone number to the PSAP.

8. The method of claim 4, where an extension of Cisco Discovery Protocol (CDP) or Simple Network Management Protocol (SNMP) is used to detect the network location information.

9. A computer-readable medium having computer-executable instruction code embodied thereon, wherein when executed cause a computer system to execute a computer-implemented method for sending an emergency services call, the method comprising:

responsive to accessing a network device, automatically detecting and saving in memory in an endpoint communications device network location information wherein:

the network location information comprises specific network device identity information and port information of the network device;

wherein the network device is in communication with a call endpoint via a port identified by the port information and wherein the network device is a repeater communicatively coupled to a registered access point; and a specific physical location of the network device is to be determined based at least in part on the network location information, the specific physical location comprising a specific civic location or geo-coordinates, or combinations thereof corresponding to the repeater;

automatically forwarding the network location information to a call server for physical location mapping to the network device and port identified in the network location information; and generating an emergency services call initiation request where the call initiation request comprises an emergency parameter and the network location information, wherein routing the call is to be based at least in part on the emergency parameter and the network location information or the physical location, or combinations thereof, wherein the emergency parameter comprises a location object or location key in presence information data format.

10. The computer-readable medium of claim 9, where the network device is in the network.

11. The computer-readable medium of claim 9, where the call endpoint is a mobile telephone.

12. The computer-readable medium of claim 9 where the computer-implemented method for sending the emergency services call further comprises, automatically updating the network location information if the specific network device identity information or port information changes, or combinations thereof.

13. A computer-readable medium having computer-executable instruction code embodied thereon, wherein when executed cause a computer system to execute a computer-implemented method for routing an emergency services call, the method comprising:

receiving an emergency services call initiation request where the call initiation request comprises current network location information and an emergency parameter, wherein the emergency parameter comprises a location object or location key in presence information data format;

analyzing network location information received in the call initiation request, wherein the network location information comprises specific network device identity information and port information of the network device, wherein the port is for connecting an endpoint to the network and wherein the network device is a repeater communicatively coupled to registered access point;

accessing a database to retrieve physical location information to identify a physical location of the endpoint;

receiving an indication of the physical location of the endpoint from the database, wherein the database is for mapping the network location information to a specific civic location or geo-coordinates, or combinations thereof corresponding to the repeater; and routing the emergency services request call based at least in part on the physical location information or on the network location information, or combinations thereof.

14. The computer-readable medium of claim 13 wherein routing further comprising accessing a server where the server provides routing information to route the emergency services call to a Public Safety Answering Point (PSAP) based at least in part on the physical location information.

15. The computer-readable medium of claim 14 where the computer-implemented method for routing an emergency services call further comprises, accessing a second database to obtain routing information corresponding to selecting an Emergency Services Gateway (ESGW) based at least in part on the physical location information.

16. The computer-readable medium of claim 14 where the computer-implemented method for routing the emergency services call further comprises, providing the physical location information to the PSAP with the call.

17. The computer-readable medium of claim 13 where the computer-implemented method for routing the emergency services call further comprises, mapping the physical location information to an E.164 telephone number and forwarding the E.164 telephone number to the PSAP.

18. The computer-readable medium of claim 13 an extension of Cisco Discovery Protocol (CDP) or Simple Network Management Protocol (SNMP) is used to detect the network location information.

19. A system for locating an endpoint in a network, the system comprising:

an endpoint configured to:

connect to the network;

automatically detect and save in memory in an endpoint communications device network location information, wherein the network location information comprises specific network device identity information and port identification information, wherein the network device is in communication with the endpoint communications device via a port identified by the port identification information, wherein a physical location of the endpoint communications device is to be mapped to both the network device identity and the port identification and is to be determined based at least in part on the network location information, the physical location comprising a specific civic location or geo-coordinates;

generate an emergency services call initiation request wherein the call initiation request comprises an emergency parameter and the network location information, wherein the emergency parameter comprises a location object or location key;

automatically forward the network location information for physical location mapping to the network location, wherein routing the call is to be based at least in part on the network location information or the physical location;

a call server configured to:

receive the emergency services call initiation request including the network location information and the emergency parameter;

analyze the network location information received in the call initiation request wherein the network location information comprises the network device identity information and the port information;

access a VoIP Positioning Center (VPC) to retrieve physical location information to identify a specific physical location of the endpoint communications device, the specific physical location corresponding to the network location information received in the call wherein the physical location comprises a specific civic location or geo-coordinates;

wherein the VPC includes a Location Information Server (LIS) configured to map the network location information to the specific civic location or geo-coordinates of the endpoint communications device;

access a second database to obtain routing information corresponding to selecting an Emergency Services Gateway (ESGW) based at least in part on the physical location information; and route an emergency services request call based at least in part on the physical location information or on the network location information, or combinations thereof.

\* \* \* \* \*